April 8, 1924. Re. 15,814

F. P. MILLER

REAMER

Original Filed Dec. 14. 1922

INVENTOR

F. P. Miller

BY

L. G. Quesada

ATTORNEY

Reissued Apr. 8, 1924. Re. 15,814

UNITED STATES PATENT OFFICE.

FRANK P. MILLER, OF MEADVILLE, PENNSYLVANIA.

REAMER.

Original No. 1,475,311, dated November 27, 1923, Serial No. 606,888, filed December 14, 1922. Application for reissue filed February 5, 1924. Serial No. 690,886.

*To all whom it may concern:*

Be it known that I, FRANK P. MILLER, a citizen of the United States, and a resident of Meadville, in the county of Crawford and State of Pennsylvania, have invented certain new and useful Improvements in Reamers, of which the following is a specification.

This invention relates to reamers and more particularly to the blades thereof.

In reamers now in use the blades are formed with a land or guide portion, the edges of which are parallel and the forward end of the land abruptly terminates at the flat inclined lead or cutting portion of the reamer. It has been found as the result of extensive use that such a blade dulls quickly and does not provide a smooth hole.

Therefore, an important object of this invention is to provide a reamer blade in which the lead is rounded and into which the lead merges whereby the cutting edge is maintained for a long period and whereby a smooth hole is provided.

Further, the improved reamer blade is formed with a land which gradually tapers toward its forward end and merges into the lead approximately where the radius of the same begins thereby providing an additional cutting edge.

A further object is to provide a reamer having blades of the character specified which may be economically manufactured or ground and which may be employed without radically departing from established shop practice.

Other objects and advantages of the invention will be apparent during the course of the following description.

Figure 1:
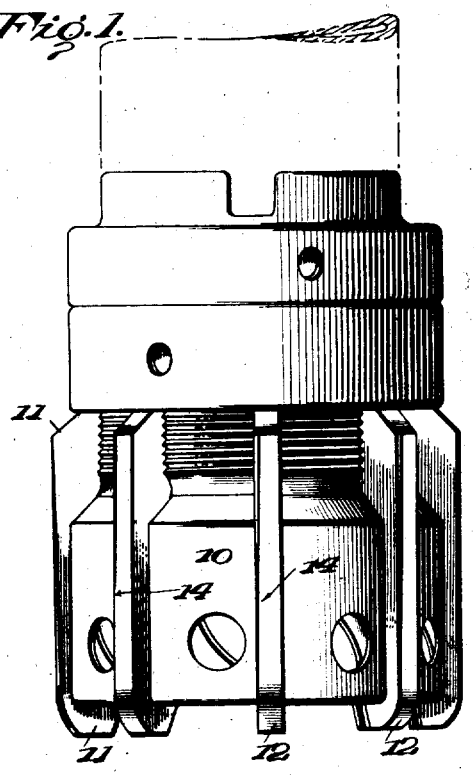
Figure 3:
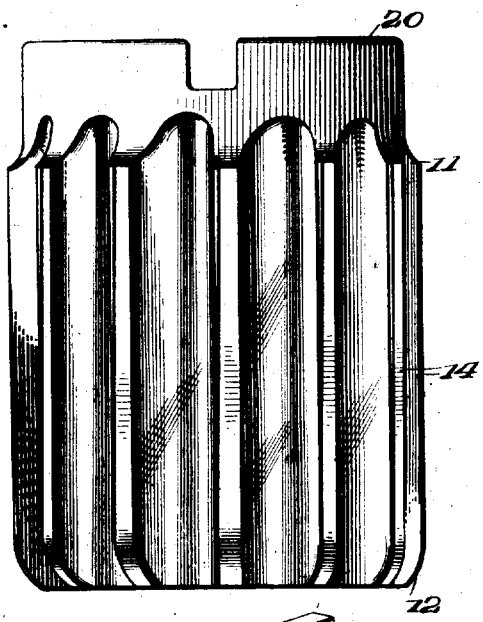
Figure 2:
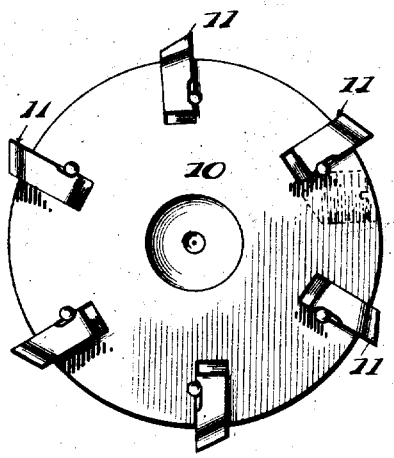
Figure 5:
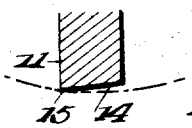
Figure 6:
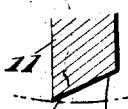
Figure 4:
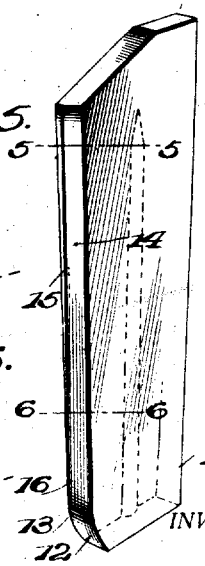

In the accompanying drawing forming a part of this specification and in which like numerals designate like parts throughout the same, Figure 1 is a side elevation of one form of reamer equipped with the improved blades, Figure 2 is an end elevation of the reamer illustrated in Figure 1, Figure 3 is a side elevation of a reamer having integral blades constructed in accordance with this invention, Figure 4 is a perspective of one of the blades detached, Figure 5 is a detail transverse sectional view taken on line 5—5 of Figure 4, Figure 6 is a detail transverse sectional view taken on line 6—6 of Figure 4.

In the drawing wherein for the purpose of illustration is shown a preferred embodiment of the invention the numeral 10 designates a reamer equipped with a plurality of blades 11 which may be held in position by the means illustrated in Figures 1 and 2, or by any other means.

Specifically each blade is formed with a rounded lead 12 inclined transversely to produce a cutting edge 13, and it will be seen that the outer edge of the blade is ground to produce a clearance 14.

In carrying out the invention the grinding of the blade to produce the clearance 14 produces what is known in the art as the "land," the edges of which are ordinarily parallel. However, Figures 4, 5, and 6 illustrate that the land is, in this case, gradually tapered to a point and merges into the cutting edge 13 approximately where the radius of the rounded lead begins whereby to produce an additional cutting edge 16 which co-operates with the cutting edge 13 of the rounded lead to provide a perfectly smooth hole.

In summarizing it might be stated that this invention consists particularly in producing the rounded lead in combination with the tapered land so as to provide the additional cutting edge 16 and to provide a reamer blade which maintains its cutting edge for a large number of reaming operations.

Figures 4, 5 and 6 further illustrate that the clearance 14 gradually decreases in width toward the rear end of the blade as the edges of the land 15 gradually diverge toward the rear end of the blade.

The inventive idea disclosed in this application may be carried out in an adjustable reamer as illustrated in Figure 1, or in the reamer 20 illustrated in Figure 3, and which has integral blades.

It is to be understood that the form of the invention herewith shown and described is to be taken merely as a preferred example of the same and that such minor changes in arrangement and construction of parts may be made as will remain within the spirit of the invention and the scope of what is claimed.

Having thus described my invention, what is claimed is:—

1. A reamer blade having a rounded lead and a tapered land merging into the cutting edge of the lead.

2. A reamer blade having a lead and a tapered land merging into the cutting edge of the lead.

3. A reamer blade having a rounded lead and a land tapered to a point and merging into the cutting edge of the lead to produce an additional cutting edge immediately back of the lead.

4. A reamer blade having a lead and a land tapered to a point and merging into the cutting edge of the lead to produce an additional cutting edge immediately back of the lead.

FRANK P. MILLER.